US011378412B2

(12) United States Patent
Belzner et al.

(10) Patent No.: US 11,378,412 B2
(45) Date of Patent: Jul. 5, 2022

(54) DEVICE AND METHOD FOR OUTPUTTING NAVIGATION INFORMATION, AND VEHICLE

(71) Applicant: Bayerische Motoren Werke Aktiengesellschaft, Munich (DE)

(72) Inventors: Heidrun Belzner, Seefeld (DE); Daniel Kotzor, Seefeld (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/056,051

(22) PCT Filed: Apr. 17, 2019

(86) PCT No.: PCT/EP2019/060029
§ 371 (c)(1),
(2) Date: Nov. 17, 2020

(87) PCT Pub. No.: WO2019/219325
PCT Pub. Date: Nov. 21, 2019

(65) Prior Publication Data
US 2021/0080283 A1 Mar. 18, 2021

(30) Foreign Application Priority Data
May 18, 2018 (DE) .................... 10 2018 207 863.7

(51) Int. Cl.
G01C 21/36 (2006.01)
G01C 21/34 (2006.01)
(Continued)

(52) U.S. Cl.
CPC ..... G01C 21/3685 (2013.01); G01C 21/3453 (2013.01); G06N 7/005 (2013.01);
(Continued)

(58) Field of Classification Search
CPC ............ G01C 21/3685; G01C 21/3453; G01C 21/34; G01C 21/3415; G06N 7/005;
(Continued)

(56) References Cited

U.S. PATENT DOCUMENTS

2009/0309761 A1* 12/2009 Nagase .............. G01C 21/3617
340/932.2
2012/0161984 A1 6/2012 Amir
(Continued)

FOREIGN PATENT DOCUMENTS

DE 10 2015 111 218 A1 1/2016
DE 10 2015 002 405 A1 8/2016
(Continued)

OTHER PUBLICATIONS

International Search Report (PCT/ISA/210) issued in PCT Application No. PCT/EP2019/060029 dated Aug. 1, 2019 with English translation (four (4) pages).
(Continued)

Primary Examiner — Ryan W Sherwin
(74) Attorney, Agent, or Firm — Crowell & Moring LLP

(57) ABSTRACT

A device and a method for outputting navigation information for a vehicle are provided. Position data, destination data, and parking data containing information relating to at least two parking space positions and the availability of parking spaces at the at least two parking space positions can be provided via an input interface. A data processing device is configured to determine an order in which at least some of the at least two parking space positions should be approached based on the provided position data, destination data and parking data in such a manner that the determined order meets an optimization criterion. The data processing device is also configured to check whether the optimization criterion can be met by waiting at the at least one parking
(Continued)

space position or by returning to a parking space position to be approached before the at least one parking space position.

7 Claims, 2 Drawing Sheets

(51) Int. Cl.
  *G06N 7/00* (2006.01)
  *G06Q 30/02* (2012.01)
  *G08G 1/14* (2006.01)
(52) U.S. Cl.
  CPC ......... *G06Q 30/0284* (2013.01); *G08G 1/143* (2013.01); *G08G 1/146* (2013.01)
(58) Field of Classification Search
  CPC .... G06Q 30/0284; G08G 1/143; G08G 1/146; G08G 1/148
  See application file for complete search history.

(56) References Cited

U.S. PATENT DOCUMENTS

| | | |
|---|---|---|
| 2016/0025503 A1 | 1/2016 | Kees et al. |
| 2017/0178511 A1* | 6/2017 | Berns ................ G08G 1/143 |
| 2018/0053422 A1 | 2/2018 | Altinger |
| 2018/0121833 A1* | 5/2018 | Friedman ........... G06Q 10/0631 |
| 2018/0150773 A1* | 5/2018 | Lee ........................ G06Q 10/02 |
| 2018/0336784 A1* | 11/2018 | Liu .................. G08G 1/096866 |
| 2018/0357906 A1* | 12/2018 | Yaldo ................. B62D 15/0285 |
| 2019/0236951 A1* | 8/2019 | Mason .................... G08G 1/146 |

FOREIGN PATENT DOCUMENTS

| | | |
|---|---|---|
| DE | 20 2016 003 680 U1 | 10/2017 |
| DE | 10 2017 201 242 A1 | 11/2017 |
| ER | 2 587 220 A1 | 5/2013 |

OTHER PUBLICATIONS

German-language Written Opinion (PCT/ISA/237) issued in PCT Application No. PCT/EP2019/060029 dated Aug. 1, 2019 (six (6) pages).

German-language Search Report issued in German Application No. 10 2018 207 863.7 dated Mar. 28, 2019 with partial English translation (11 pages).

* cited by examiner

DEVICE AND METHOD FOR OUTPUTTING NAVIGATION INFORMATION, AND VEHICLE

BACKGROUND AND SUMMARY OF THE INVENTION

The present invention relates to a device and a method for outputting navigation information for a vehicle, in particular a motor vehicle, as well as a vehicle having such a device.

To assist the driver of a vehicle during the route planning, navigation devices are known which generally calculate one or more routes optimized with respect to the travel time and/or the fuel consumption from a location of the vehicle to a destination and output corresponding navigation information to the driver.

However, the driver typically cannot park his vehicle directly at the destination, but rather has to find a parking space for his vehicle, possibly even before reaching the destination. The travel time until reaching the destination is typically extended in this case by the period necessary for the parking space search and the walk from a parking space which has been found to the destination. Therefore, navigation devices have been developed which calculate a route optimized with respect to parking space options. For this purpose, empirically ascertained probabilities, provided by a parking information service, for example, for finding a parking space and/or a current parking space availability, for example, reported online, can for example be taken into consideration in the calculation.

It is an object of the present invention to improve the navigation from a current position of the vehicle to a destination position, in particular to optimize it with respect to the total required time for reaching the destination being traveled toward.

This object is achieved by a device and a method for outputting navigation information for a vehicle, in particular a motor vehicle, according to the independent claims.

A device according to the invention for outputting navigation information for a vehicle, in particular a motor vehicle, has at least one input interface, via which position data, which contain information with respect to the present position of the vehicle, destination data, which contain information with respect to the position of the destination being traveled toward by the vehicle, and parking data, which contain information with respect to at least two parking space positions and the availability of parking spaces at the at least two parking space positions, can be provided. A data processing unit is designed to ascertain a sequence in which at least a part of the at least two parking space positions are to be approached, on the basis of the provided position data, destination data, and parking data, in such a way that the ascertained sequence meets an optimization criterion. Furthermore, the data processing unit is designed to check for at least one of the parking space positions whether the optimization criterion can be met by waiting at the at least one parking space position or by returning to a parking space position to be approached chronologically before the at least one parking space position. The ascertained sequence can be output as navigation information via at least one output interface.

A vehicle according to the invention, in particular a motor vehicle, has a device according to the invention for outputting navigation information.

In the method according to the invention for outputting navigation information for a vehicle, in particular a motor vehicle, position data, which contain information with respect to the present position of the vehicle, destination data, which contain information with respect to the position of the destination being traveled toward by the vehicle, and parking data, which contain information with respect to at least two parking space positions and the availability of parking spaces at the at least two parking space positions, are provided. Moreover, a sequence in which at least a part of the at least two parking space positions is to be approached is ascertained on the basis of the provided position data, destination data, and parking data in such a way that the ascertained sequence meets an optimization criterion. In this case, it is checked for at least one of the parking space positions whether the optimization criterion is met by waiting at the at least one parking space position or by returning to a parking space position to be approached chronologically before the at least one parking space position. The ascertained sequence is output as navigation information.

One aspect of the invention is based on the approach of taking into consideration at least two parking space positions in the route planning of future parking space availabilities which will possibly change in the course of time. It is thus possible by waiting at one parking space position and/or by again approaching an already previously approached parking space position to find a parking space in a shorter time than is possible by conventional, linear approach of one parking space position after another.

To ascertain a route optimized with respect to the travel time, i.e., from a present position of the vehicle until reaching, possibly partially by foot, a destination being traveled toward, position data of the vehicle, destination data of the destination being traveled toward, and parking data of parking space positions located in the region of the destination being traveled toward are provided via at least one input interface. For example, signals emitted by satellites can be received via an interface to ascertain a present position of the vehicle. In addition, an address corresponding to the destination being traveled toward can be input by the driver of the vehicle via another interface, such as a keyboard, a touchscreen, and/or a speech recognition unit. The parking data can be received, for example, via an air interface, such as a mobile wireless connection, or can be read out from a database.

By means of a data processing unit, a sequence can be ascertained in which various parking space positions are to be approached to meet an optimization criterion, for example, finding a free parking space with a predetermined probability and simultaneously minimizing the time required for finding the free parking space. A route can then be calculated from the ascertained sequence, which takes the vehicle from its present position to at least one parking space position and takes the driver of the vehicle from the parking space position at which he has found a parking space, with the presumably shortest time expenditure to the destination being traveled toward. The ascertained sequence, under certain circumstances, for example, if a parking space position having high parking space availability is located in the immediate vicinity of the destination, can also only contain one parking space position at which the vehicle is to wait if no parking space should be free right away.

In this case, it is checked by the data processing unit, possibly in the context of a so-called branch-and-bound method, whether the optimization criterion can be met, for example the travel time can be minimized further by approaching one or more of the parking space positions for the first time and/or waiting at one of the parking space positions until a parking space becomes free there, and/or at least one of the parking space positions is approached multiple times. Waiting at one of the parking space positions and/or returning to an already previously approached parking space position is advantageous in particular if a street in the region of this parking space position, in particular the parking space position itself, is heavily utilized, but the parking space position has a high availability rate, i.e., parking spaces at the parking space position become free at short time intervals.

On the basis of the ascertained sequence, which is preferably optimized with respect to the optimization criterion, the data processing unit preferably generates an item of navigation information, which contains, for example, a path description from the present position of the vehicle to the parking space positions according to the ascertained sequence. The navigation information is output to the driver of the vehicle via at least one output interface, for example a loudspeaker and/or a display unit in the vehicle, who can drive the vehicle on the basis of the navigation information to the first in the ascertained sequence of parking space positions and subsequently to the further parking space positions according to the ascertained sequence until he finds a free parking space or waits or is supposed to wait for a free parking space at a parking space position.

The device does not necessarily have to be part of the vehicle or integrated into the vehicle in this case. The navigation information can be output during the travel or beforehand, in particular also by a portable terminal, such as a smart phone.

Overall, the invention enables improved navigation from a present position of the vehicle to a destination position, in particular with respect to the total required time to reach the destination being traveled toward. This in particular permits time savings for the driver, a reduction of the traffic volume, and/or a reduction of emissions.

In one preferred embodiment, the data processing unit is designed to ascertain the check as to whether the optimization criterion can be met by waiting at the at least one parking space position in consideration of costs. The costs preferably result here from a first availability model, which depicts the chronological development of the availability of parking spaces at the at least one parking space position. By means of the first availability model, a waiting time can preferably be reliably ascertained, after which a parking space will become free at the at least one parking space position with a predetermined probability. The costs resulting for the waiting at the at least one parking position, in particular dependent on the waiting time, are preferably determined by a cost function, preferably dependent on the waiting time, and taken into consideration in the ascertainment of the sequence in which at least a part of the at least two parking space positions are to be approached. An optimum sequence can thus be reliably ascertained.

In a further preferred embodiment, the first availability model, which is preferably based on an exponential distribution, relates an availability rate, according to which parking spaces become available at a parking space position, to a waiting time at the at least one parking space position, after which a parking space will become free at this parking space position. The number of the parking spaces at the corresponding parking space position is preferably also taken into consideration here. This permits a robust estimation of the required waiting time and thus also of the costs caused by the waiting.

Alternatively, however, the first availability model can also be based on another function.

The availability rate, which can be made available by the parking data, for example, is preferably a function of a mean parking time of vehicles at the corresponding parking space position. The mean parking time and thus also the availability rate can be ascertained easily, for example empirically, and provided by a parking information service.

In a further preferred embodiment, the data processing unit is designed to influence the costs resulting from the first availability model by specifying a probability with which a parking space will become available by waiting at the at least one parking space position. For example, it can be specified that a parking space should be available with a probability of 90% or higher by waiting at the at least one parking space position. As a function of the availability rate, in particular if other vehicles park for a long time on the parking spaces and therefore parking spaces only become free rarely, it is necessary to wait a long time for this purpose, whereby high costs result. With the aid of the first availability model, the waiting time required for this purpose, and thus also the costs linked thereto, may be reliably calculated in particular in consideration of a cost function dependent on the specified probability.

In a further preferred embodiment, the data processing unit is designed to ascertain the check as to whether the optimization criterion can be met by returning to a parking space position to be approached chronologically before the at least one parking space position in consideration of a conditional availability of parking spaces at the parking space position to be approached chronologically before the at least one parking space position. The conditional availability results here from a second availability model, which depicts the chronological development of the availability of parking spaces at the parking space positions to be approached chronologically before the at least one parking space position. The second availability model is preferably designed in such a way that the depicted conditional availability of parking spaces is in particular dependent here on whether and/or at which time the parking space position to be approached again was already previously approached, in particular how much time has passed between the prior and the further approach. Alternatively, however, the depicted limited availability of parking spaces can also be independent of the time span which has passed between the prior and the further approach of the parking space position. With the aid of the second availability model, the optimum sequence in which at least a part of the at least two parking space positions are to be approached can be ascertained reliably and efficiently.

The second availability model preferably supplies a conditional availability, which corresponds to a conditional probability with which a free parking space will be found upon a renewed approach to the parking space position. This conditional probability is preferably taken into consideration in the check as to whether the optimization criterion can be met by a return to the already previously approached parking space position. In particular, it can be checked in consideration of the conditional availability whether a parking space having a conditional probability will become available due to the renewed approach to the previously already approached parking space position, which is equal to or greater than a predetermined probability with which a parking space is supposed to be found.

In a further preferred embodiment, the second availability model, which is preferably based on a Markov chain, relates a parking rate, according to which parking spaces at a parking space position are occupied, to an availability rate, according to which parking spaces at a parking space position become available. The second availability model can advantageously be formulated as a matrix differential equation to depict the chronological development of free parking spaces at the parking space position to be approached again. This matrix differential equation can be solved, for example, by an approximation method in order to obtain a probability with which a free parking space is available upon the renewed approach to the parking space position at a later time. The optimum sequence in which at least a part of the at least one parking space position is to be approached can thus be ascertained particularly reliably and efficiently.

Further features, advantages, and possible applications of the invention result from the following description in conjunction with the figures, in which the same reference signs are used throughout for the same or corresponding elements of the invention. In the at least partially schematic figures:

DETAILED DESCRIPTION OF THE DRAWINGS

Figure 1:
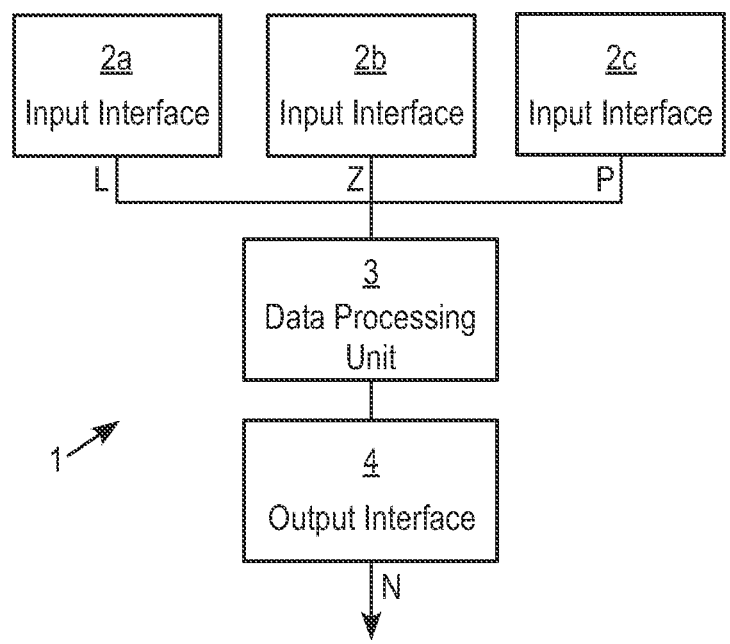
FIG. 1 shows an example of a device for outputting navigation information.

FIG. 1 shows an example of a device 1 for outputting navigation information N for a vehicle having three input interfaces 2a, 2b, 2c, a data processing unit 3, and an output interface 4.

Position data L, which contain information with respect to the present position of the vehicle, can be provided via a first input interface 2a. The first input interface 2a can establish a data connection to multiple satellites for this purpose, for example, in order to ascertain the present position of the vehicle on the basis of signals received via this data connection.

Destination data Z, which contain information with respect to the position of the destination being traveled toward by the vehicle, can be provided via a second input interface 2b. The second input interface 2b can acquire an input of the driver of the vehicle for this purpose, for example, by means of a keyboard, a touchscreen, or a microphone, for example, from which the destination, in particular an address, emerges.

Parking data P, which contain information with respect to at least two parking space positions and the availability of parking spaces at the at least two parking space positions, can be provided via a third input interface 2c. The third input interface 2c can for example have an air interface for this purpose and can be designed, to establish a data connection to a parking information service, for example via a wireless Internet connection, wherein the parking data P can preferably be retrieved from a server. Alternatively or additionally, the third input interface 2c can have a database or can be connectable to a database, which contains the parking data P.

The data processing unit 3 is designed to ascertain, on the basis of the position data L, the destination data Z, and the parking data P, a sequence in which at least two parking space positions are to be approached by the vehicle on the search for a parking space in the region of the destination being traveled toward, preferably to find a parking space at one of these parking space positions with a probability predetermined, for example, at the factory or by the driver, for example via the second input interface 2b. The sequence is ascertained here in such a way that an optimization criterion is met, for example the total travel time is minimal, which depicts the required time for the travel from the present position of the vehicle until finding a parking space and a walk from the parking space position at which a parking space was found to the destination being traveled toward.

The data processing unit 3 is preferably designed here to apply various procedures for the parking space search, in particular to combine them with one another. A first procedure is, for example, approaching multiple parking space positions in succession, preferably in dependence on a travel route to be covered between the parking space positions, the respective distance between each of the parking space positions and the destination being traveled toward and/or among one another and/or the availability of parking spaces at the parking space positions, i.e., the probability of finding a free parking space upon approaching the parking space positions.

A second procedure is, for example, waiting at a parking space position to be approached until a parking space becomes free at this parking space position $P_i$. A third procedure is, for example, approaching one or more parking space positions multiple times, i.e., returning to a parking space position already previously approached. In the second and third procedure, a future occupancy of the parking spaces at the parking space positions $P_i$ is preferably taken into consideration. The future parking space occupancy, in particular the chronological development of the parking space occupancy, can be modeled, for example, by means of an availability model, in particular in consideration of an availability rate, at which parking spaces become free at the corresponding parking space position $P_i$. The availability rate can be or can have been empirically ascertained or estimated, for example.

To find the sequence optimized with respect to the total travel time of the driver, the data processing unit 3 can apply, for example the so-called branch-and-bound method. A strategy tree is preferably developed in this case, the branches of which depict the various possible sequences. The development of a branch can be terminated, i.e. the corresponding sequence can be discarded, if the optimization criterion cannot be met in this branch, i.e., for example, if a parking space can be found with the same probability in another branch of the strategy tree in a shorter time and/or at a shorter distance from the destination being traveled toward. Alternatively or additionally, the development of a branch can be terminated if the minimum expected travel time cannot be achieved.

In the ascertainment of the optimum sequence, the data processing unit 3 preferably takes into consideration costs which result due to the trips between the various parking space positions and/or due to waiting at a parking space position. The costs preferably depict the required time which is linked to carrying out a strategy, and can be ascertained by corresponding cost functions.

The sequence thus ascertained can be output via the output interface 4, for example via a display unit and/or a loudspeaker as navigation information N.

Figure 2:
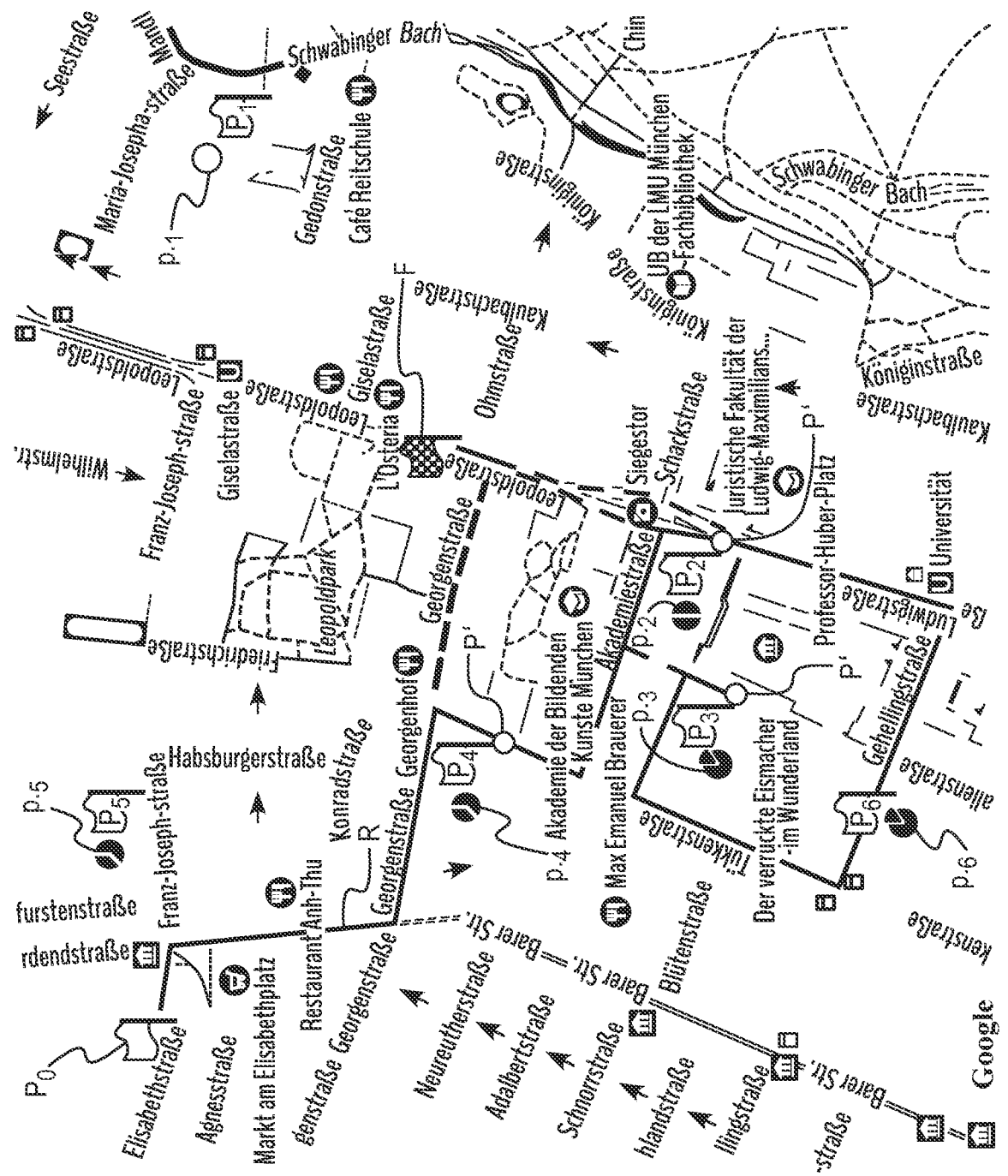
FIG. 2 shows an example of an ascertained sequence in which parking space positions are to be approached.

FIG. 2 shows an example of an ascertained sequence in which parking space positions $P_i$ with i=1 . . . 6 are to be approached. The parking space positions $P_i$ are shown together with a present position $P_0$ of a vehicle and a position F of a destination being traveled toward on a map. Each parking space position $P_i$ is assigned an availability $p_{\pi i}$ with i=1 ... 6 of parking spaces, shown as a pie chart, which corresponds to a probability of finding a free parking space at the corresponding parking space position $P_i$ upon the, in particular initial approach.

In the example shown, it is assumed that the driver of the vehicle wants to go from the position $P_0$ to the destination F being traveled toward. The driver obviously first requires a parking space and then has to cover the last section on foot. At each of the parking space positions $P_i$, he has the option of waiting until a parking space becomes available or testing out another parking space position $P_i$. The approach can be repeated until the driver finally finds a parking space or waits for free parking space at a parking space position $P_i$.

Solely by way of example, a route R is shown as a solid wide line, which corresponds to a strategy optimum for the driver, i.e., traveling along the parking space positions $P_i$ in an optimum sequence to reach the destination F with minimal costs, in particular in the shortest time. In this case, preferably only routes R or sequences are accepted which have a success rate of 90% or higher.

Parking attempts P' are indicated by empty circles. In the present case, not all parking space positions $P_i$ are approached. The driver first attempts to find a parking space at parking space position $P_4$, and drives further to parking space position $P_2$ if he is not successful. He then drives on at parking space position $P_3$ to look for a parking space, if he is again not successful. Upon reaching the parking space position $P_3$, the probability, which is cumulative in particular, of having found a parking space is greater than 90%. If the driver still should not have found a parking space up to parking space position $P_3$, he can wait at parking space position $P_3$ until a parking space becomes free there. The pedestrian route to be covered in the case of success is shown as a dashed black line.

Figure 3:
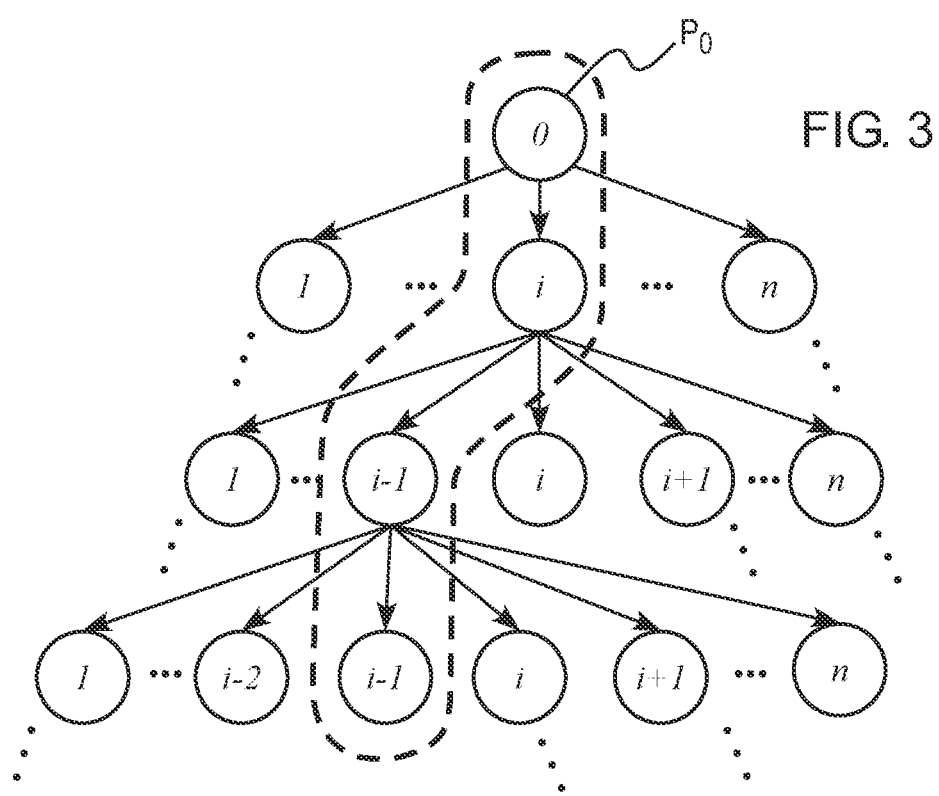
FIG. 3 shows an example of the ascertainment of a sequence in which parking space positions are to be approached.

FIG. 3 shows an example of the ascertainment of a sequence in which parking space positions $P_i$ with i=1 ... n are to be approached using a vehicle. The possible parking space positions $P_i$ are indicated by numbered circles arranged horizontally adjacent to one another. From each of the parking space positions $P_i$, either another parking space position $P_i$ can be approached, or it is possible to wait at the corresponding parking space position $P_i$ until a parking space becomes free. These options are indicated by arrows, so that starting from a present position $P_0$ of the vehicle, a strategy tree results, the branches of which each form a sequence of parking space positions $P_i$ to be approached. One of these sequences is indicated by the black dashed line. According to this sequence, the vehicle is firstly to approach the position $P_i$. If a free parking space is not available there, the parking space position $P_{i-1}$ is thus to be approached. If a free parking space is not available there right away, the driver should wait there until a parking space becomes free.

Each possible sequence represents a strategy $\pi$ for finding a parking space, which is successful with a cumulative probability at which a parking space is to be found in the parking space positions $P_i$ contained in the sequence. The probability of being successful after approaching j various parking space positions $P_i$ is with as the availability of a parking space at the parking space position $P_i$. The success $$p_\pi^j = (1-p_{\pi_i}) \ldots (1-p_{\pi_{j-1}}) p_{\pi j}$$

with $p_{\pi_i}$ as the availability of a parking space at the parking space position $P_i$. The success rate of a specific strategy $\pi$ with m attempts of finding a parking space at various parking space positions $P_i$ therefore results as $$p_\pi = \sum_{j=1}^{m} p_\pi^j.$$

Since the success rate increases with each additional attempt to find a parking space at a further parking space position $P_i$, the strategy tree is finite, wherein each branch of the strategy tree ends when the success rate $p_\pi$ corresponding to it is greater than a predetermined probability $p_{acc}$ of finding a parking space.

The optimum sequence is ascertained in consideration of costs which result due to following the different strategies and preferably correspond to the required total time until a parking space is found and from there the destination being traveled toward is reached on foot. To ascertain costs which result due to driving with the vehicle or a walk, for example, from the present position $P_0$ of the vehicle to a parking space position $P_i$ or from a parking space position $P_i$ to a parking space position $P_i$ or from a parking space position $P_i$ to the destination being traveled toward, route calculation methods are known from the prior art, such as Nokia HERE, Grasshopper, or Google routing.

Cost functions can be assumed here, which quantify the costs of the above-mentioned driving or walking times, possibly also in dependence on a state of the vehicle, for example an orientation of the vehicle on the road.

To calculate the costs of a strategy $\pi$, according to which the vehicle should wait at a parking space position $P_i$, a first availability model can be taken into consideration, which is preferably based on an exponential distribution. An availability rate $$\mu = \frac{1}{mttp}$$

is preferably incorporated into the first availability model, in which mttp (mean time to park) indicates the mean time at which vehicles park at the corresponding parking space position $P_i$. The availability rate therefore corresponds to a rate at which parking spaces become free at the parking space position $P_i$. Then $$p = 1 - e^{-tn\mu}$$

is the probability that a parking space will become free with n occupied parking spaces after the time t. Correspondingly, the waiting time until a parking space becomes free with a probability greater than p is $$t = \frac{-\log(1-p)}{n\mu}.$$

If a driver waits, for example, at a parking space position $P_i$ with n=10 occupied parking spaces, which are typically parked on for approximately t=30 minutes, the driver has to wait approximately t=13.82 minutes to find a free parking space with 99% probability. The costs for this waiting time can be specified, for example, by a cost function $c_{wait}(p,j)$ with $1 \le j \le n$, wherein $c_{wait}$ quantifies the costs for waiting at the parking space position $P_j$ until a parking space becomes free with a probability greater than p.

In some cases, it can be promising for the driver to again approach a parking space position $P_j$ which has already been approached. While the costs of again approaching a parking space position $P_i$ from the parking space position $P_j$ are given time-independently by a cost function $c_d(i,j,s)$, wherein s characterizes a state of the vehicle, the availability of free parking spaces at the parking space position $P_j$ changes upon the renewed approach. This availability is therefore also referred to as conditional availability. The time-dependent or conditional availability corresponds to a probability of finding a free parking space upon the renewed approach, after a free parking space was not found upon the prior approach, and can be ascertained on the basis of a second availability model.

A statistical model, with the aid of which the time-dependent or conditional availability can be estimated, is the birth and death process, i.e., a homogeneous Markov process. Two parameters are preferably incorporated in this model: $\lambda$ is the query rate and characterizes the number of the vehicles which wish to park on the parking space per unit of time, for example per hour, and $\mu$ is the availability rate. The probability that a new vehicle arrives at the parking space and that at least one vehicle leaves the parking space is preferably modeled in each case by an exponential distribution.

While the query rate is independent of the number of vehicles which are already parked on parking spaces at the parking space position $P_j$, the availability rate increases the more parking spaces are occupied. Moreover, the query rate and the availability rate are preferably time-dependent, for example on the time of day or even season. With $\lambda(t)$ and $\mu(t)$ as functions of time, the probabilities for various occupancy states at the parking space position $P_j$ can be described by the following matrix differential equation:

$$\begin{bmatrix} \dot{P}_0 \\ \vdots \\ \dot{P}_i \\ \vdots \\ \dot{P}_n \end{bmatrix} = \begin{bmatrix} -\lambda & \mu & & & \\ & \ddots & & & \\ & \lambda & -(\lambda+i\mu) & (i+1)\mu & \\ & & & \ddots & \\ & & & \lambda & -n\mu \end{bmatrix} \begin{bmatrix} P_0 \\ \vdots \\ P_i \\ \vdots \\ P_n \end{bmatrix}.$$

In this case, the diagonal of the matrix contains the entries $-\lambda, \ldots, -(\lambda+i\mu), \ldots, -n\mu$. The upper secondary diagonal of the matrix contains in the upper half of the matrix the entries $\mu, \ldots, (i+1)\mu$, and the lower secondary diagonal of the matrix contains in the lower half of the matrix the entries $\lambda$. All other entries are zero. For a start vector p, the equation describes the state of parking spaces or their availability by $p(t)$ in the course of time, if $\lambda(t)$ and $\mu(t)$ are known. Using the matrix A, the equation can be written as $\dot{p}=Ap$ with $p=[P_0 \ldots P_n]^T$.

Under the assumption that A=const. in a time interval of interest, for example while the vehicle travels from one parking space position $P_i$ to another, already previously approached parking space position $P_j$, the differential equation can be solved with the aid of a matrix exponential function. For example, the approach $p(t)=e^C p_0$ with $C=A \cdot t$ can be selected, wherein $$e^C = \sum_{i=0}^{\infty} \frac{C^i}{i!}.$$

The matrix exponential function is very efficiently available, for example by applying the Padé approximation.

The return to an already previously approached parking space position $P_j$ after a time t correspondingly supplies a probability of finding a free parking space $$p(t)=e^{A \cdot t} p_0$$

with $p_0=(0 \ldots 0\ 1)^T$. This probability, which corresponds to a time-dependent or conditional availability, can be used to ascertain the optimum sequence with respect to the total travel time, in which at least a part of the at least two different parking space positions $P_i$ are to be approached.

LIST OF REFERENCE SIGNS 1 device for outputting navigation information
2a, 2b, 2c input interface
3 data processing unit
4 output interface
N navigation information
L position data
Z destination data
P parking data
$P_{i,j}$ parking space position
$p_{\pi i}$ availability
$P_0$ vehicle position
F destination position
R route
P' parking attempt
$\pi$ strategy

What is claimed is:

1. An apparatus that outputs navigation information for a vehicle, the apparatus comprising:
at least one input interface, via which position data is provided including information with respect to a present position of the vehicle, destination data including information with respect to a destination position of a destination being traveled toward by the vehicle, and parking data including information with respect to at least two parking space positions and an availability of parking spaces at the at least two parking space positions;
a data processor programmed to determine a sequence in which at least a part of the at least two parking space positions is to be approached based on the position data, the destination data, and the parking data such that the sequence meets an optimization criterion, and at a same time to check for at least one of the parking space positions whether the optimization criterion can be met by waiting at the at least one parking space position or returning to a parking space position to be approached chronologically before the at least one parking space position; and
at least one output interface, via which the sequence can be output as navigation information;
wherein the data processor is programmed to determine whether the optimization criterion can be met by waiting at the at least one parking space position in consideration of costs which result from a first availability model, which depicts a chronological development of the availability of parking spaces at the at least one parking space position.

2. The apparatus according to claim 1, wherein the first availability model, which is based on an exponential distribution, relates an availability rate, according to which parking spaces are available at the parking space position to a waiting time at the at least one parking space position.

3. The apparatus according to claim 1, wherein the data processor is designed to influence the costs resulting from the first availability model by specifying a probability, with which a parking space will become available by waiting at the at least one parking space position.

4. The apparatus according to claim 1, wherein the data processor is designed to determine whether the optimization criterion can be met by returning to a parking space position to be approached chronologically before the at least one parking space position in consideration of a conditional availability of parking spaces at the parking space position to be approached chronologically before the at least one parking space position, which results from a second availability model, which depicts the chronological development of the availability of parking spaces at the parking space positions to be approached chronologically before the at least one parking space position.

5. An apparatus that outputs navigation information for a vehicle, the apparatus comprising:
at least one input interface, via which position data is provided including information with respect to a present position of the vehicle, destination data including information with respect to a destination position of a destination being traveled toward by the vehicle, and parking data including information with respect to at least two parking space positions and an availability of parking spaces at the at least two parking space positions;
a data processor programmed to determine a sequence in which at least a part of the at least two parking space positions is to be approached based on the position data, the destination data, and the parking data such that the sequence meets an optimization criterion, and at a same time to check for at least one of the parking space positions whether the optimization criterion can be met by waiting at the at least one parking space position or returning to a parking space position to be approached chronologically before the at least one parking space position; and
at least one output interface, via which the sequence can be output as navigation information;
wherein the data processor is designed to determine whether the optimization criterion can be met by returning to a parking space position to be approached chronologically before the at least one parking space position in consideration of a conditional availability of parking spaces at the parking space position to be approached chronologically before the at least one parking space position, which results from a second availability model, which depicts the chronological development of the availability of parking spaces at the parking space positions to be approached chronologically before the at least one parking space position; and
wherein the second availability model, which is based on a Markov chain, relates a parking rate, according to which parking spaces are occupied at a parking space position, to an availability rate, according to which parking spaces become available at the parking space position.

6. A motor vehicle comprising the apparatus according to claim 1.

7. A method for navigation of a vehicle, the method comprising:
providing position data including information with respect to a present position of the vehicle;
providing destination data including information with respect to a destination position of a destination being traveled toward by the vehicle;
providing parking data including information with respect to at least two parking space positions and an availability of parking spaces at the at least two parking space positions;
determining a sequence, in which at least a part of the at least two parking space positions is to be approached based on the position data, the destination data, and the parking data such that the sequence meets an optimization criterion, and at a same time is checked for at least one of the parking space positions whether the optimization criterion is met by waiting at the at least one parking space position or returning to a parking space position to be approached chronologically before the at least one parking space position; and
outputting the sequence as navigation information;
wherein whether the optimization criterion can be met by waiting at the at least one parking space position is determined in consideration of costs which result from a first availability model, which depicts a chronological development of the availability of parking spaces at the at least one parking space position.

* * * * *